July 27, 1926.

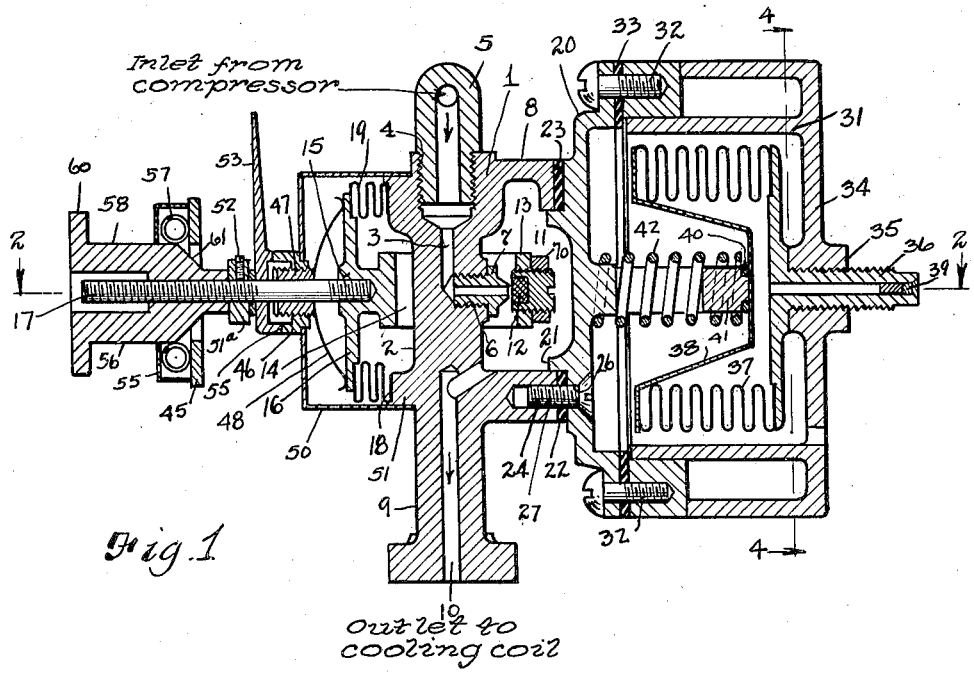

G. L. BENNETT ET AL 1,593,743

THERMOSTATIC CONTROL VALVE FOR ICELESS REFRIGERATORS

Filed Feb. 16, 1924  2 Sheets-Sheet 2

INVENTORS
George L. Bennett and
BY Hal T. Patton.
Fay, Oberlin + Fay
ATTORNEYS

Patented July 27, 1926.

1,593,743

UNITED STATES PATENT OFFICE.

GEORGE L. BENNETT, OF CLEVELAND HEIGHTS, AND HAL T. PATTON, OF EAST CLEVELAND, OHIO, ASSIGNORS TO THE FREEZERATOR COMPANY, OF CLEVELAND, OHIO, A CORPORATION OF OHIO.

THERMOSTATIC CONTROL VALVE FOR ICELESS REFRIGERATORS.

Application filed February 16, 1924. Serial No. 693,402.

The present invention relates to control valves for refrigerating systems, and more particularly relates to the construction of a control valve for automatically controlling the inflow of refrigerant liquid to the expansion coils of the system. The object of the valve is to control the flow of the refrigerant by the general temperature of the brine tank or cooling receptacle. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 3:
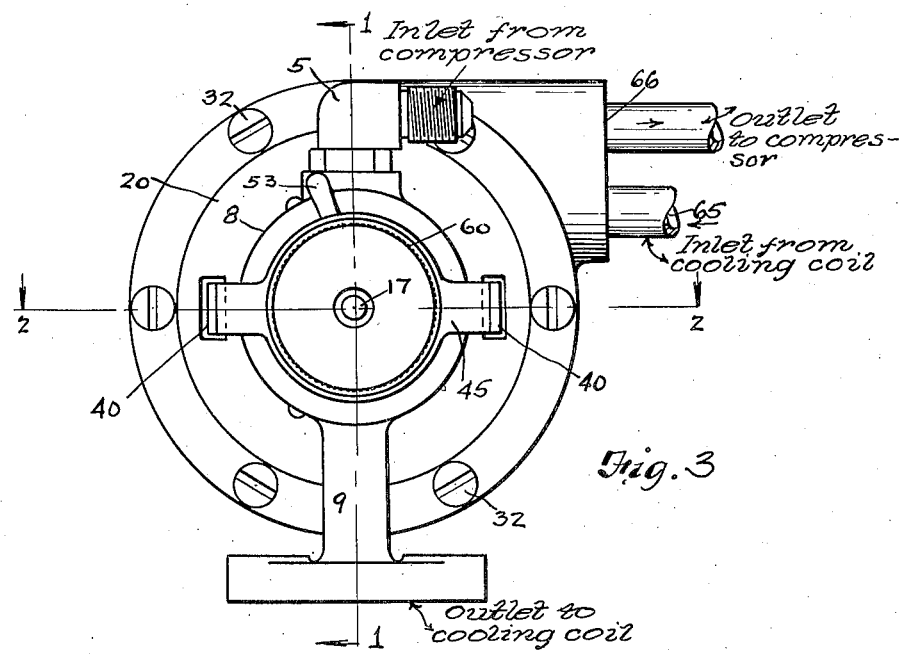
Figure 4:
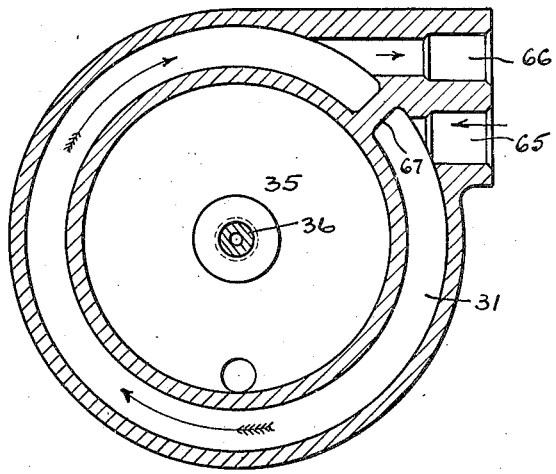

Fig. 1 is a vertical longitudinal section through the device; Fig. 2 is a longitudnal section on the line 2—2 of Fig. 1; Fig. 3 is an end elevational view of the device; and Fig. 4 is a sectional view on the line 4—4 of Fig. 1.

The present control valve comprises a central valve housing 1, provided with a centrally mounted body 2, with an upwardly extending inlet conduit 3 interiorly threaded at the upper end 4 to receive an angle nipple 5 which will be connected to the refrigerant supply conduit. The conduit 3 communicates with a horizontal interiorly threaded aperture 6, in which is mounted the valve nozzle 7. The housing has a cylindrical extension 8 covering the valve nozzle and the body has a downwardly extending connecting flange 9 provided with an outlet conduit 10 extending into the chamber 11 formed by the extension 8.

The valve mechanism proper comprises a movable valve seat 12 consisting of an adjustably mounted plug mounted in a valve plate 13, which is attached at its outer ends to an operating yoke 14. This yoke spans the central body 2 and at the other end is provided with a boss 15 and a disk 16, the boss having a threaded aperture to receive a valve stem 17. Between the disk and an annular ring 18 on the housing 1 is mounted a metal packing bellows 19 which makes an air-tight cover for this end of the valve housing. The open end of the cylindrical extension 8 is closed by a cover plate 20 formed with an inwardly extending annular flange 21 fitting within the extension 8. A packing washer 22 is mounted between the plate and the annular face 23 of the extension and the plate is secured thereto by screws 24 or the like, which extend through suitable apertures 26 in the plate and are received in threaded apertures 27 in the extension.

Attached to the outer side of the plate 20 is a cylindrical casing 31, the casing being secured to the plate by screws 32, a heat insulating ring 33 being employed between the casing and the plate. The casing end 34 is provided with an apertured boss 35 in which is threaded the hollow stem 36 of an expansible bellows 37 which is mounted within the casing and which acts as the thermostatic element. This bellows has a depressed top 38 and contains an expansible liquid which is inserted through the stem which, as shown, is afterwards sealed by a plug 39. Mounted in the depressed portion 38 is a yoke 40 carrying at the bottom a disk 41, a coiled spring 42 being mounted over the disk between the yoke and the plate 20. The two arms 43 of the yoke extend out through apertures in the cover plate 20 around the body of the valve and at their outer ends are attached to an apertured disk 45.

Mounted over the packing bellows 19 is a cover 50 which is secured onto an annular ring 51 on the valve housing and this cover carries at its center a hollow bushing 46 interiorly threaded to receive an adjustable bearing 47 for the valve stem 17. This bushing has a cam face 55. Mounted between the plate 16 and the adjustable bearing 47 is a spring disk 48, the normal tension of which may be set by the adjustable bearing 47.

On the outer end of the valve stem 17 which is threaded is adjustably mounted an operating cam cylinder 58, having a knurled flange 60 at the outer end and a cone-shaped inner end 61 forming the cam surface. A lock nut 51ª is mounted on the stem to hold the cam in adjusted position and the lock nut is provided with a set screw 52. Mounted on the stem in front of the lock nut is a washer and a handled cam operating member 53 is mounted between the lock nut and the cam face 55 on the bushing 46.

Attached to the apertured disk 45 is a cover 55 fitting loosely about the outer surface 56 of the cam cylinder 58, and a coil spring 57 is mounted within the cover and is adapted to contact about the coned surface 61 when the cylinder is moved, thus aiding in forcing the cam cylinder 58, valve stem and movable valve seat into its valve closing position. The tension is increased by that of packing bellows 19.

The casing for the thermostatic member has a double wall forming the cylindrical chamber 31 which has an inlet conduit 65 connected to the exhaust end of the expansion coil and an outlet conduit 66 adapted to be connected to the compressor suction line thus drawing the expanded refrigerant around the casing, the chamber having the interior wall 67 to force the expanded gas to encircle the case.

In the open or normal position of the valve, the bellows 37 will be extended by the pressure therein and overcoming the pressure of the coiled spring 42 will move the yoke 40 and disk 45 rearwardly along the stem forcing the spring 57 up the cam face 61 of the cam cylinder 58 and allowing the cylinder, valve stem and seat to move forwardly into the position shown in Figs. 1 and 2, which allows refrigerant to pass through the valve. This valve action is accomplished through the pressure of the spring disk 48, the tension of which may be adjusted for varying operating conditions.

As the interior of the casing 31 grows cold the bellows 37 will contract and the yoke 40 will be moved forwardly under the action of the spring 42 until the coil spring 57 works down the cam face 61 to force the cam cylinder rearwardly, thus closing the valve seat against the nozzle. If it is desired to manually close the valve, the handled cam operating member 53 may be turned away from the position shown in Fig. 1, thus closing the valve and preventing opening of the same until the handle has again been moved to release the cam cylinder and valve stem. The valve seat setting is adjustable and may be changed and locked in position by the lock nut 70. The cam cylinder 58 is also adjustable as well as the setting or tension of the spring disk and thus the valve may be set to suit the wide range of operating conditions which are met with in installing household refrigerating systems.

The valve is also automatic in its operative or open position to vary the valve opening so as to feed the refrigerant fluid at a rate to maintain a substantially constant predetermined pressure in the expansion coil. The disk 16 and the packing bellows 19 form a closed chamber in communication with the expansion coil and this chamber, of course, receives the back pressure from the coils. The back pressure acting on the disk 16 moves the disk and valve toward the closed position thus decreasing the flow of refrigerant through the valve. In this manner an automatic control of the valve is obtained which tends to maintain the pressure in the expansion coils constant and this is independent of the main opening and closing of the valve by the main bellows 37.

Furthermore, the ice box temperature does not quickly control the valve action as the thermostat is acted on by the combined temperature of the ice box and that of the expanded refrigerant in the chamber surrounding the same. Thus the operation of the valve is slowed down and small changes in ice box temperature, due to opening of the door and the like, do not have immediate effect, but the valve only opens when the combined temperature drops enough to operate the thermostatic element.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a thermostatic valve for refrigerating systems the combination of a valve casing having a body member provided with a valve nozzle, a double walled thermostat casing attached thereto, a cover mounted on said body member, a yoke movably mounted in said casing, a valve seat carried by said yoke, a valve stem attached thereto, resilient means normally holding said valve in its open position, an expansible member mounted in said thermostat casing, means loosely connecting said expansible member and said valve stem and adapted to close said valve upon predetermined contraction of said expansible member, and hand-operated cam means mounted on said valve stem and cover and adapted to close said valve and maintain the same in closed position.

2. In a thermostatic valve for refrigerating systems, the combination of a valve casing having a body member provided with a valve nozzle, a double walled thermostat casing attached thereto, a cover mounted on said body member, a yoke movably mounted in said casing, a valve seat carried by said yoke, a valve stem attached thereto, resilient means normally holding said valve in its open position, an expansible member mounted in said thermostat casing, an adjustable cam member mounted on said valve stem, and means attached to said expansible member and loosely connected with said adjustable cam member and adapted to move said cam member to close said valve upon predetermined contraction of said expansible member.

3. In a thermostatic valve for refrigerating systems, the combination of a valve casing having a body member provided with a valve nozzle, a double walled thermostat casing attached thereto, a cover mounted on said body member, a yoke movably mounted in said casing, a valve seat carried by said yoke, a valve stem attached thereto, resilient means normally holding said valve in its open position, an expansible member mounted in said thermostat casing, an adjustable cam member mounted on said valve stem, means attached to said expansible member and loosely connected with said adjustable cam member and adapted to move said cam member to close said valve upon predetermined contraction of said expansible member, and hand-operated cam means mounted on said valve stem and cover and adapted to close said valve and maintain the same in closed position.

4. In a thermostatic valve for refrigerating systems, the combination of a valve casing having an apertured body member provided with a removable valve nozzle and adapted to be connected in the refrigerant fluid line, said casing having a cylindrical thermostat casing attached at one side, and having a cover at the other side, a valve stem movably mounted in said cover, a yoke connected to said valve stem and passing around said valve body member, a valve seat plate carried by said yoke, an adjustable valve seat removably mounted in said plate, an adjustable cam member mounted on said valve stem, spring means normally forcing said valve to its open position, a thermostatic bellows mounted in said cylindrical casing, two arms connected to said bellows and extending beyond said valve casing, an apertured plate attached to said arms and surrounding said cam member, spring means carried by said apertured plate and adapted to co-act with said cam member to move the same and close said valve upon contraction of said bellows.

5. A thermostatic valve construction for use with refrigerating coils comprising a valve body member having a valve nozzle, a movable valve seat having a valve stem, resilient means normally maintaining said valve in its open position, a thermostatic member, means loosely connecting said thermostatic member and said valve stem and adapted upon contraction of said member to move said valve stem and close said valve, and independent means for operating said movable valve seat and adapted to control the size of the opening to maintain a substantially constant pressure in the refrigerating coils.

6. A thermostatic valve construction for use with refrigerating expansion coils comprising a valve body member having a valve nozzle, a movable valve seat having a valve stem, resilient means normally maintaining said valve in its open position, a thermostatic member, means loosely connecting said thermostatic member and said valve stem and adapted upon contraction of said member to move said valve stem and close said valve, and independent means connected to said valve seat and operable from the pressure in the expansion coil to vary the valve opening to maintain the pressure on said coil substantially constant.

7. In a thermostatic valve for refrigerating systems having expansion coils, the combination of a valve casing having a body member provided with a valve nozzle, a double walled thermostat casing attached thereto, a cover mounted on said body member, a yoke movably mounted on said casing, a valve seat carried by said yoke, a valve stem attached thereto, resilient means normally holding said valve in its open position, an expansible member mounted in said thermostat casing, an adjustable cam member mounted on said valve stem, means attached to said expansible member and loosely connected with said adjustable cam member and adapted to move said cam member to close said valve upon predetermined contraction of said expansible member, a disk on said valve seat yoke, a packing bellows mounted between said disk and valve casing and forming a closed chamber in communication with the outlet side of said valve, said packing bellows being expansible under back pressure from the expansion coil to move said valve seat to vary the flow of refrigerant to maintain a substantially constant back pressure on the expansion coil.

Signed by us, this 12th day of February, 1924.

GEORGE L. BENNETT.
HAL T. PATTON.